United States Patent
Lassonde et al.

(10) Patent No.: US 11,415,461 B2
(45) Date of Patent: Aug. 16, 2022

(54) LINEAR TIME-GATE METHOD AND SYSTEM FOR ULTRASHORT PULSE CHARACTERIZATION

(71) Applicants: INSTITUT NATIONAL DE LA RECHERCHE SCIENTIFIQUE, Quebec (CA); UNIVERSITE DE BORDEAUX, Bordeaux (FR); CENTRE NATIONAL DE LA RECHERCHE SCIENTIFIQUE, Paris (FR); COMMISSARIAT À L'ÉNERGIE ATOMIQUE ET AUX ÉNERGIES ALTERNATIVES, Paris (FR)

(72) Inventors: Philippe Lassonde, Montreal (CA); Guilmot Ernotte, Ottawa (CA); Bruno E. Schmidt, Montreal (CA); François Légaré, St-Eustache (CA); Stéphane Petit, Belin-Beliet (FR); Jean-Christophe Delagnes, Begles (FR); Eric Cormier, Cestas (FR); Adrien Leblanc, Montreal (CA)

(73) Assignees: INSTITUT NATIONAL DE LA RECHERCHE SCIENTIFIQUE; L'UNIVERSITÉ DE BORDEAUX; LE CENTRE NATIONAL DE LA RECHERCHE SCIENTIFIQUE; COMMISSARIAT À L'ÉNERGIE ATOMIQUE ET AUX ÉNERGIES

(*) Notice: Subject to any disclaimer, the term of this patent is extended or adjusted under 35 U.S.C. 154(b) by 0 days.

(21) Appl. No.: 16/650,828

(22) PCT Filed: Sep. 24, 2018

(86) PCT No.: PCT/CA2018/051199
§ 371 (c)(1),
(2) Date: Mar. 25, 2020

(87) PCT Pub. No.: WO2019/056127
PCT Pub. Date: Mar. 28, 2019

(65) Prior Publication Data
US 2020/0278253 A1    Sep. 3, 2020

Related U.S. Application Data

(60) Provisional application No. 62/666,782, filed on May 4, 2018, provisional application No. 62/562,623, filed on Sep. 25, 2017.

(51) Int. Cl.
G01J 3/45     (2006.01)
G01J 3/42     (2006.01)
G01J 11/00    (2006.01)

(52) U.S. Cl.
CPC .  G01J 3/42 (2013.01); G01J 3/45 (2013.01); G01J 11/00 (2013.01)

(58) Field of Classification Search
CPC ................. G01J 3/42; G01J 3/45; G01J 11/00
See application file for complete search history.

(56) References Cited

U.S. PATENT DOCUMENTS 3,521,070 A   7/1970   Duguay et al.
5,530,544 A   6/1996   Trebino et al.
(Continued)

FOREIGN PATENT DOCUMENTS

JP    2001272279 A   10/2001
WO       9700429 A1    1/1997

OTHER PUBLICATIONS

Lee, K.F., et al., Characterization of mid-inftared femtosecond pulses [Invited]. Journal of the Optical Society of America B, 2008. 25(6) pp. A54-A62.
(Continued)

*Primary Examiner* — Jonathan M Hansen
(74) *Attorney, Agent, or Firm* — Lavery, De Billy, LLP; Gwendoline Bruneau

(57) ABSTRACT

A method comprising forming a linear temporal non-stationary amplitude filter by interacting a high intensity ultrashort laser pump pulse with a photo-excitable material, focusing an ultrashort broadband laser probe pulse over the photo-excited material, acquiring a two-dimensional spectrogram and retrieving amplitudes and phases of both temporal probe pulse and linear non-stationary amplitude filter from the two-dimensional spectrogram.

19 Claims, 13 Drawing Sheets

(56) References Cited

U.S. PATENT DOCUMENTS

| 5,754,292 | A | * | 5/1998 | Kane | G01J 11/00 |
| | | | | | 356/450 |
| 6,064,682 | A | * | 5/2000 | Vickers | H01S 5/06216 |
| | | | | | 372/25 |
| 6,819,428 | B2 | | 11/2004 | Ogawa | |

OTHER PUBLICATIONS

Trebino, R., et al., Measuring ultrashort laser pulses in the time-frequency domain using frequency-resolved optical gating. Review of Scientific Instruments, 1997. 68(9) pp. 3277-3295.

Trebino, R., Frequency-resolved optical gating: the measurement of ultrashort laser pulses. 2012: Springer Science & Business Media.

Miranda, M., et al., Characterization of broadband few-cycle laser pulses with the d-scan technique. Optics Express, 2012. 20(17): p. 18732-18743.

Lozovoy, V.V., I. Pastirk, and M. Dantus, Multiphoton intrapulse interference. IV. Ultrashort laser pulse spectral phase characterization and compensation. Optics Letters, 2004. 29(7): pp. 775-777.

Iaconis, C. and I.A. Walmsley, Self-referencing spectral interferometry for measuring ultrashort optical pulses. IEEE Journal of Quantum Electronics, 1999. 35(4): pp. 501-509.

Yoav, A., G. Iddo, and S. Szymon, Laser pulse frequency shifting by ionization and recombination fronts in semiconductor plasma. Journal of Physics B: Atomic, Molecular and Optical Physics, 2005. 38(7): p. 779.

Verhoef, A.J., et al., Plasma-blueshift spectral shear interferometry for characterization of ultimately short optical pulses. Optics Letters, 2009. 34(1): pp. 82-84.

Wu, Q. and X.C. Zhang, Ultrafast electro-optic field sensors. Applied Physics Letters, 1996. 68(12): pp. 1604-1606.

Cuadrado-Laborde, C., et al., Phase recovery by using optical fiber dispersion. Optics Letters, 2014. 39(3) pp. 598-601.

Bionta, M., et al., Spectral encoding based measurement of x-rayoptical relative delay to ~10 fs rms. Proceedings of SPIE—The International Society for Optical Engineering, 2012. 8504. 10.111712.929097.

Spence, D.E., P.N. Kean, and W. Sibbett, 60-fsec pulse generation from a self-mode-locked Tisapphire laser. Optics Letters, 1991. 16(1) pp. 42-44.

Piché, M. and F. Salin, Self-mode locking of solid-state lasers withoutapertures. Optics Letters, 1993.18(13): pp. 1041-1043.

Kane, D.J. and R. Trebino, Characterization of arbitrary femtosecond pulses using frequency-resolved optical gating. IEEE Journal of Quantum Electronics, 1993. 29(2) pp. 571-579.

Wu, Q. and X.-C. Zhang, Free-space electro-optics sampling of mid-inftared pulses. Applied Physics Letters, 1997. 71 (10): pp. 1285-1286.

Walmsley, I.A. and V. Wong, Characterization of the electric field of ultrashort optical pulses. Journal of the Optical Society of America B, 1996. 13(11): pp. 2453-2463.

Hartmann, et al., Sub-femtosecond precision measurement of relative X-ray arrival time for free-electron lasers. Nat Photon, 2014. 8(9): pp. 706-709.

Bionta, M.R., et al., Spectral encoding method for measuring the relative arrival time between x-ray/optical pulses. Review of Scientific Instruments, 2014. 85(8): p. 083116.

Pavel Sidorenko, Oren Lahav, Zohar Avnat, and Oren Cohen, "Ptychographic reconstruction algorithm for frequency-resolved optical gating: super-resolution and supreme robustness," Optica 3, 1320-1330 (2016).

Keiber, S., Sederberg, S., Schwarz, A. et al. Electro-optic sampling of near-infrared waveforms. Nature Photon 10, 159-162 (2016). https://doi.org/10.1038/nphoton.2015.269.

Thiré, N., et al., 10 mJ 5-cycle pulses at 1.8 μm through optical parametric amplification, Appl. Phys. Lett. 106, 091110 (2015); https://doi.org/10.1063/1.4914344.

* cited by examiner

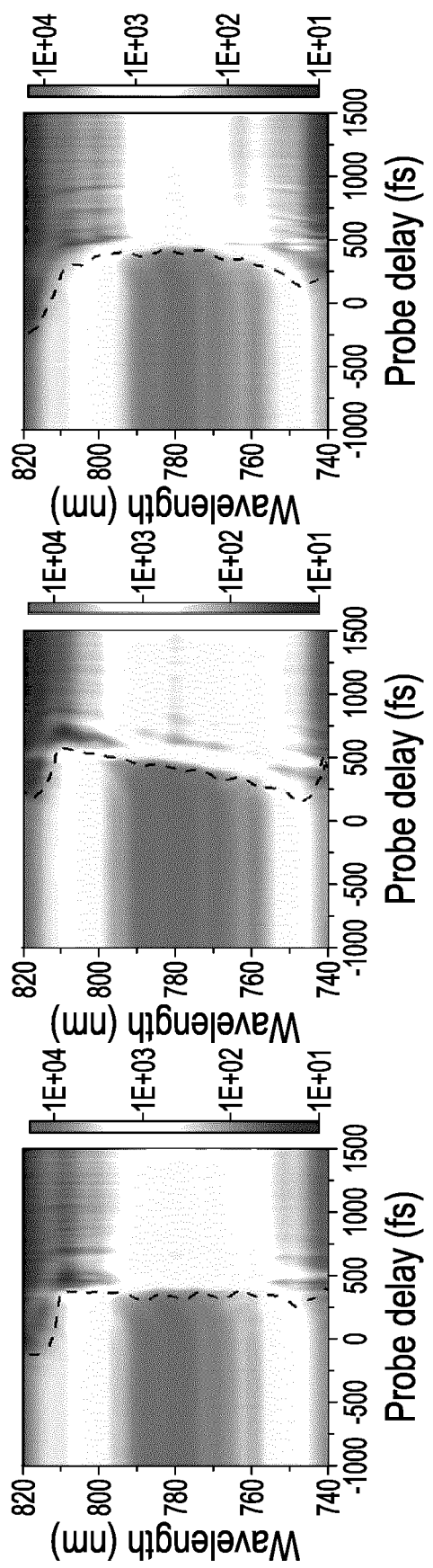

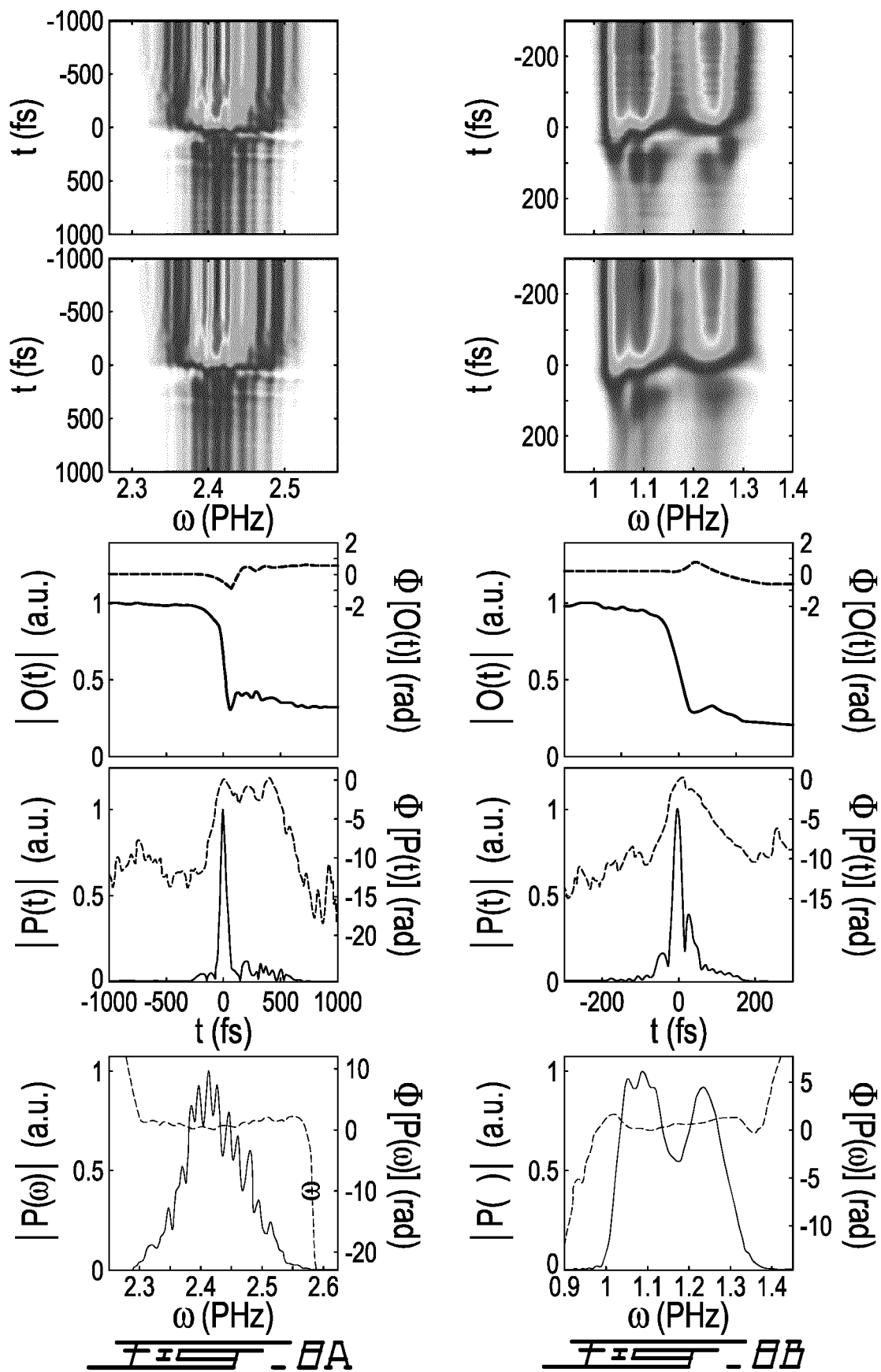

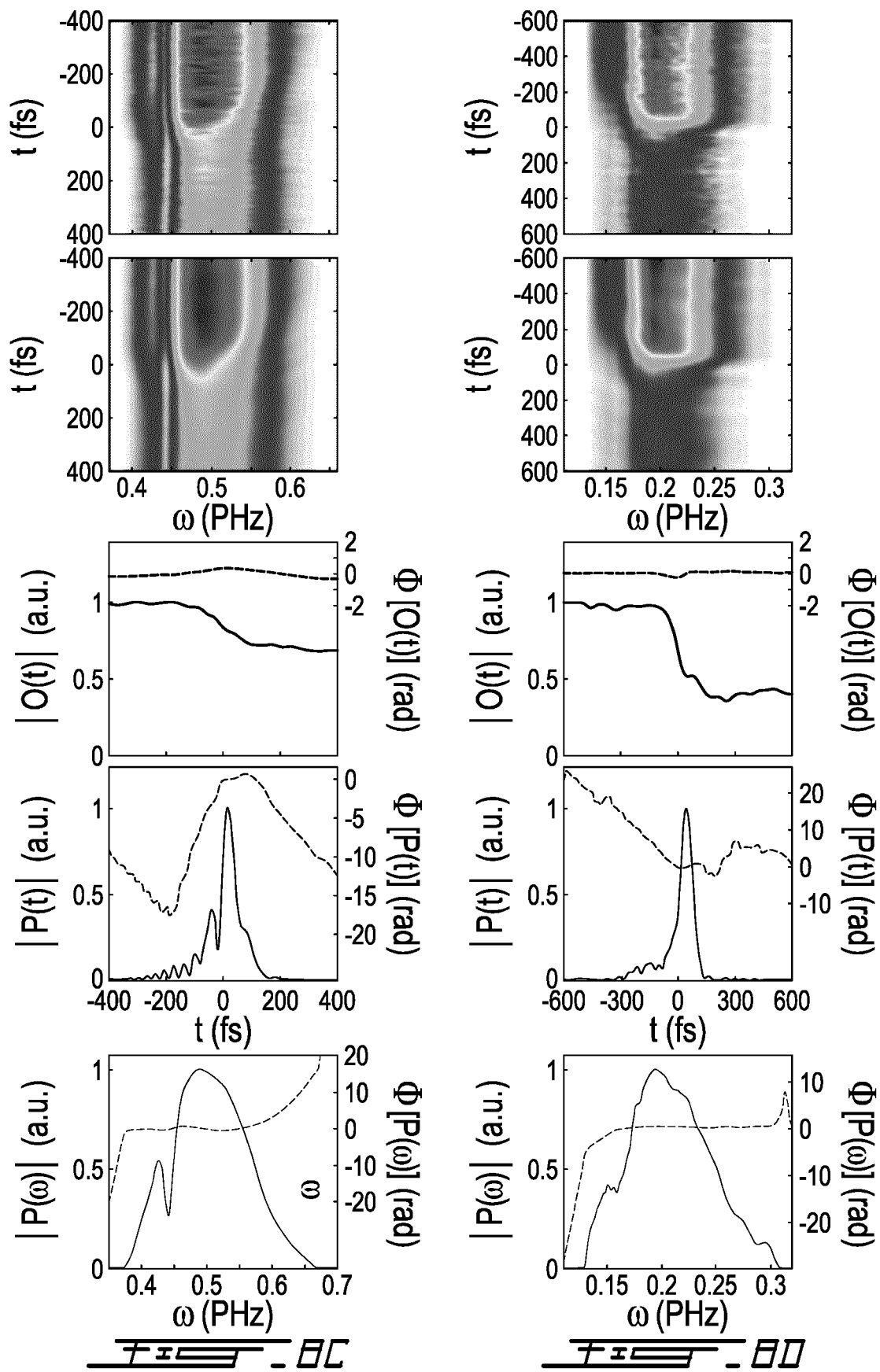

LINEAR TIME-GATE METHOD AND SYSTEM FOR ULTRASHORT PULSE CHARACTERIZATION

CROSS-REFERENCE TO RELATED APPLICATIONS

This application is a National Entry Application of PCT application no PCT/CA2018/051199 filed on Sep. 24, 2018 and published in English under PCT Article 21(2), which itself claims benefit of U.S. provisional application Ser. No. 62/562,623, filed on Sep. 25, 2017 and U.S. provisional application Ser. No. 62/666,782, filed on May 4, 2018. All documents above are incorporated herein in their entirety by reference.

FIELD OF THE INVENTION

The present invention relates to ultrashort pulse characterization. More specifically, the present invention is concerned with a linear time-gate method and a system for ultrashort pulse characterization.

BACKGROUND OF THE INVENTION

Laser ultrashort pulse characterization requires measuring or retrieving complex electric fields either in the spectral domain or in the temporal domain.

Since the emergence of Kerr-lens mode-locked laser sources [1, 2], there has been a constant need to fully characterize the complex electric field of ultrashort pulses to access their intensity distribution on the femtosecond timescale.

So far, numerous optical methods have been developed and refined to measure the temporal profile of increasingly short or complex pulses. Main methods include frequency-resolved optical gating (FROG), spectral-shearing interferometry, electro-optical sampling and multi-photon intra-pulse interference phase scan for example [3-7].

In general, such methods can be classified as linear or nonlinear depending on the relative variation of the measured signal as compared with the actual phase variation of the characterized electric field. While gating methods are nonlinear at the present state of technology, most of the interferometric methods are linear. One of the major benefits from interferometric methods is that the information is obtained by measuring the fundamental spectrum at the same level as the pulse to be characterized, which allows increasing the detection limit as compared with optical gating methods in which the signal is obtained through lower efficiency processes. Furthermore, spectral shearing mechanisms with virtually no bandwidth limitation have been demonstrated [8], which is highly suitable for characterization of very low intensity, ultra-broadband laser pulses.

Frequency-resolved optical gating method (FROG) is a phase retrieving procedure to characterize, both in amplitude and phase, a femtosecond pulse. The method comprises measuring the spectra resulting from the frequency mixing of different pulses P(t) and O(t) in a nonlinear crystal with respect to their relative delay $t_0$, resulting in a 2D intensity map, so-called FROG trace [2, 3].

Different variations exist. Second harmonic generation frequency-resolved optical gating (SHG FROG) and transient grating frequency-resolved optical gating (TG FROG), with pulses respectively $O(t)=P(t)$ and $O(t)=|P(t)|^2$ are used in the visible and near-IR range. Blind-FROG or X-FROG methods are used to characterize mid-IR pulses, as the long wavelengths are upconverted into visible or near-IR for which spectrometers are widely available. For example, a 10 µm pulse can be converted to a 740 nm signal by sum frequency generation with an 800 nm pulse.

Despite their wide flexibility, optical gating techniques may find limitations in characterization of low intensity broadband pulses. Based on nonlinear processes, they are bandwidth limited and require a sufficient pulse intensity as the measured signal is a $n^{th}$-order function of the pulse intensity with n>1. For broadband pulses, the limitation in bandwidth due to phase matching can be relaxed using very thin nonlinear crystals, with a thickness less than 10 µm for instance, but the thinner the crystals, the lower the measured signal is, and the more challenging the measurement is to perform.

Some methods comprise recording the second-harmonic spectrum as a function of a controlled modification of the characterized pulse, resulting also into a spectrogram. In the case of the D-scan method, the second-harmonic spectrum is recorded as a function of the amount of dispersive glass introduced in the pulse path [4]. This method was derived from the multiphoton intrapulse interference phase scan (MIIPS), a similar method employing a pulse shaper rather than dispersive glass [5]. In both methods, the phase is retrieved using an iterative algorithm.

Spectral domain interferometry is a general pulse characterization linear method. For example, by measuring spectral interference between a pulse and a delayed pulse with known spectral phase, the phase is extracted by Fourier transformation and the unknown phase is determined by subtracting the reference phase to the measured phase. Since a reference pulse is not always available, a self-referenced variation of this method includes spectral shear interferometry in which the phase information is retrieved from the interference between two replicas with a slight frequency shift. This frequency shift can be obtained by different means such as the sum-frequency of a pair of delayed pulse replicas with a highly dispersed pulse [6]. It can also be obtained by propagation of one of the pulse pair into an ionized bulk materials or gas [7, 8]. Such a technique can be complex to implement, and its precision may be limited by the capability of the spectrometer to resolve the interference fringes.

For broadband pulses, characterization methods include electro-optical sampling (EOS), which directly measures the electric field and has therefore no phase matching condition. It consists in changing a material birefringence by a strong pump pulse to be characterized, probed by the polarization rotation of a sampling pulse whose time width is shorter or on the same timescale as the pump field period. The bandwidth limitation lies in the shortest timescale accessible for the sampling pulse. It was recently extended down to 1.2 µm-pulses [1]. However, this method requires a pump pulse strong enough to change the material birefringence and, most of all, with a carrier envelop phase (CEP) stabilized. For many applications, CEP stability is not required and is a too strong investment if only in the aim of having the capability to characterize the pulse. [9].

A fully linear stationary method has been developed, in which intensity profiles are measured prior and after propagation inside a well-defined dispersive medium. This method is qualified as stationary because the process allowing measuring the phase, in this case, the dispersion in the medium, is time-independent. The phase is then inferred by recursive Fresnel transformations of the intensity profiles. However, this method does not apply to ultrashort pulses since it requires time resolved detection of the intensity profile that can be achieved only with relatively long pulses (limited by the photovoltaic detector response) [10].

In the current state of the art, most of the characterization methods involve nonlinear transformation such as frequency mixing, and phase-matching must be achieved over the complete bandwidth of the pulse to be characterized. This is possible, for example, if using very thin nonlinear crystals or through higher order nonlinear processes like in TG-FROG for example, but the result is a much lower signal than the initial pulse by several orders of magnitude. In the case where the initial pulse is already at the lower limit of detection, this effect is compromising the ability to readily acquire the information signal, especially in the case of low intensity and low average power emission of an ultrashort broadband pulse. Such a type of emission could be the super continuum resulting from the filamentation of a femtosecond laser pulse propagating inside a bulk medium, a microstructured optical fiber, or through gas. The non-linear methods are also very sensitive to the calibration of the spectrometers in both wavelength and amplitude as for the FROG approach for instance, the phase is coded in the FROG trace amplitude.

There is still a need for a method and a system for ultrashort pulse characterization.

SUMMARY OF THE INVENTION

More specifically, in accordance with the present invention, there is provided a method comprising forming a linear temporal non-stationary amplitude filter by interacting a high intensity ultrashort laser pump pulse with a photo-excitable material, focusing an ultrashort broadband laser probe pulse over the photo-excited material, acquiring a two-dimensional spectrogram and retrieving amplitudes and phases of both temporal probe pulse and linear non-stationary amplitude filter from the two-dimensional spectrogram.

There is further provided a method comprising propagating a first ultrashort laser pulse through a low band-gap material photoexcited by a second independent ultrashort laser pulse, measuring a transmitted spectrum as a function of a delay between the first ultrashort laser pulse and the photoexcited material and obtaining phase characterization of the first ultrashort laser pulse from the measurement.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1D shows time-resolved absorption profiles for variable linear polarization angles in ZnO (read legend as pump/probe angles);

FIGS. 2A, 2B and 2C show time-resolved absorption spectrograms at 780 nm using 0.5 mm thick ZnSe photo-excitation;

FIG. 8A shows results of a reconstruction for pulses with central wavelength of 800 nm according to an embodiment of an aspect of the present disclosure;

FIG. 8B shows results of a reconstruction for pulses with central wavelength of 1650 nm according to an embodiment of an aspect of the present disclosure;

FIG. 8C shows results of a reconstruction for pulses with central wavelength of 4.8 μm according to an embodiment of an aspect of the present disclosure;

FIG. 8D shows results of a reconstruction for pulses with central wavelength of 10 μm according to an embodiment of an aspect of the present disclosure.

DESCRIPTION OF ILLUSTRATIVE EMBODIMENTS

Figure 1A:
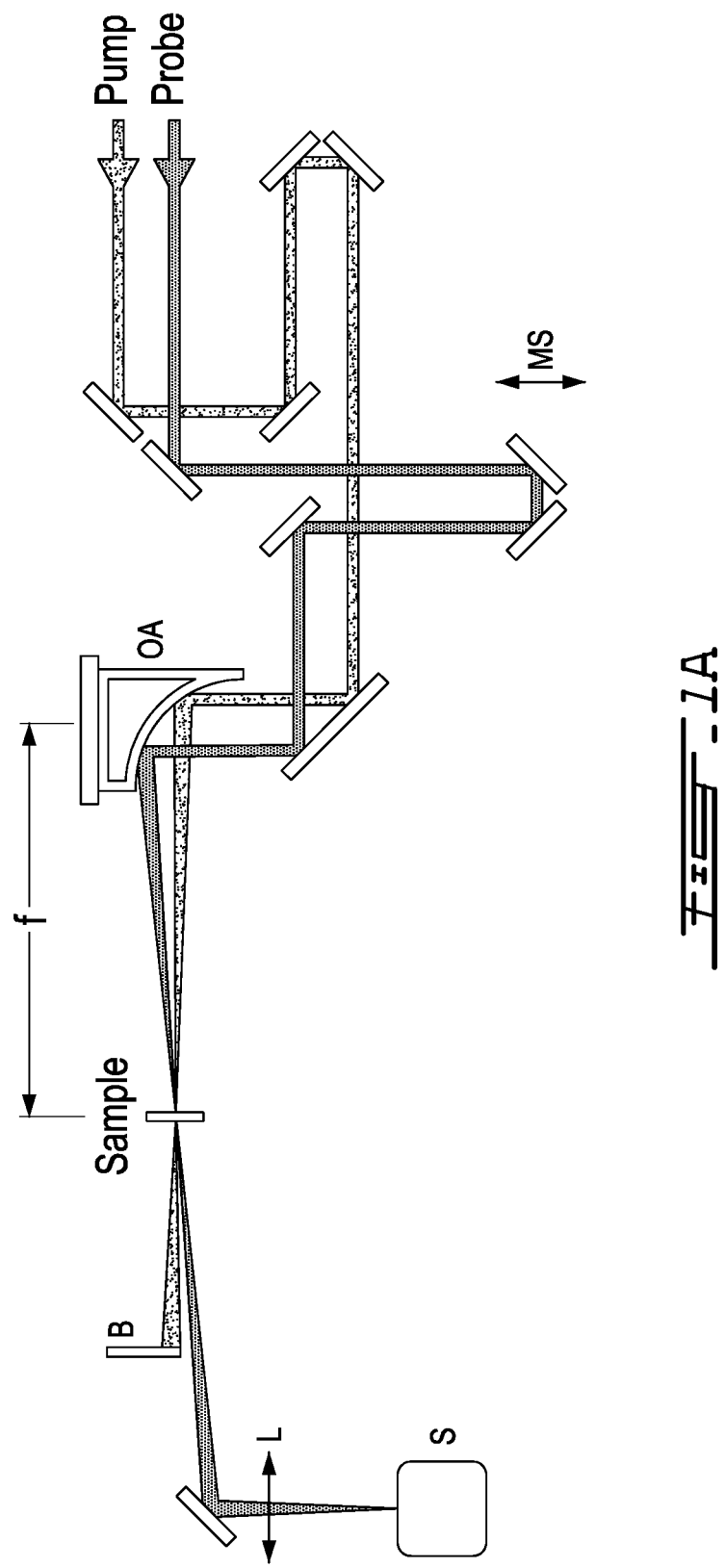
FIG. 1A shows a system according to an embodiment of an aspect of the disclosure.

The present invention is illustrated in further details by the following non-limiting examples.

In a nutshell, there is presented a method and a system to characterize the complex field amplitude and phase and measure the temporal intensity distribution of an ultrashort laser pulse. The method and the system provide frequency resolving and measuring the convolution of two independent objects in time, from a spectrogram allowing to retrieve both objects independently and without assumption. The first temporal object is a free carriers time-gate induced in a material by a high intensity ultrashort laser pulse referred to as the pump pulse. The second temporal object is an independent ultrashort broadband laser pulse, referred to as the probe pulse.

The pump pulse creates the step-like transient absorption, transmission or reflection time-gate by interaction with a material such as a dielectric or a semi-conductor in which free electrons are promoted through photoexcitation. The excited material represents, for the probe pulse, a step function time-gate proportional to the free electrons or free carriers density evolution in the material. The probe pulse is either transmitted through the excited material or reflected from the surface of the excited material.

The pump pulse is selected with a duration of at most 1 ps, an intensity of at least $1 \times 10^{12}$ W/cm$^2$ at the surface of the material and a wavelength in the range between about 200 nm and about 20 microns.

The probe pulse is selected with a duration comprised in the range between about 5 fs and about 1 ns, for example between about 1 fs and about 1 ns, an intensity selected so that the probe pulse does not excite the material, for example of at most $1 \times 10^{11}$ W/cm$^2$ at the surface of the material, and a wavelength in the range between about 200 nm and 20 microns. $0 > \Delta\omega/\omega_0 > 2$, $\Delta\omega$ being the bandwidth thereof and $\omega_0$ the central frequency thereof.

A range of materials can be used, having a band gap in the range between about 0.5 and about 9 ev, below 4 eV for example, depending on the pump wavelength, comprised in the range between about 200 nm and 20 µm, for example between about 200 nm and 4 µm.

The convolution between the time-gate and the probe pulses is made by varying the delay of the probe pulse with respect to the excited material forming the transient time-gate. The convolution signal is frequency resolved and measured with a photosensitive detector to record a two-dimensional spectrogram in which both temporal objects are encoded. The amplitudes and phases of both temporal objects are then retrieved without any prior assumption, by using iterative ptychographic numerical methods for example. This method enables temporal characterization of ultrashort and broadband pulses, such as pulses of intensities below $1 \times 10^9$ W/cm$^2$, with different central frequencies in the range between about 15 and about 600 THz, total bandwidth $0 > \Delta\omega/\omega_0 > 2$ and accumulated chirp $\phi_2/\tau \gg 1$ where $\phi_2$ is the chirp parameter and $\tau$ is the transform limited pulse duration.

In relation to FIGS. 1 to 7 for example, an optical system employed to fabricate the transient gate and to generate the spectrogram resulting from the convolution between the time-gate and the probe pulse is described, as well as a method to extract the information from the frequency resolved measured spectrogram. Another retrieval method is described in relation to FIG. 8.

Experiments were conducted at the Advanced Laser Light Source (ALLS) with a pump-probe time-resolved absorption optical system schematically shown in FIG. 1A. The pump and probe pulses were delivered and/or derived from a conventional chirped pulse amplification (CPA) Ti: sapphire laser system (not shown) delivering 790 nm, 35 fs pulses at a repetition rate of 2.5 kHz split between two independent grating compressors. During the experiments, the pump pulse was kept at a fixed pulse duration of 35 fs and central wavelength of 780 nm and the energy per pulse was varied from 0.3 to 10 µJ. The pump pulse at focus was measured using a CCD camera (not shown) to estimate the applied fluence. It was elliptical with 47×16 µm diameter in 1/e$^2$.

During the experiments, it was observed that moving the photo-exited material slightly out of focus allowed to optimize the absorption contrast ratio because the pump and probe pulses did not have the same size or were not focusing exactly at the same position. There was an optimal overlap position different than the pump focusing position Therefore, the energy was adjusted to reach the absorption saturation and the fluence was set below the material ablation threshold. For instance, absorption saturation was reached at 1 µJ in silicon (FIG. 1C) while it was reached at 4.8 µJ for a ZnSe material in the case of probing the pulse at a central wavelength of 2 µm.

In an embodiment illustrated in FIG. 1A, a motorized translation stage MS positioned on the probe pulse path created a delay line and was interfaced to a computer with different spectrometers (not shown) to cover the full accessible spectral range provided by the probe pulselines. The pump and probe pulses were spatially separated during propagation parallel to an off-axis parabolic mirror OA with focal distance f=150 mm where they were focused and overlapped onto a material to be photoexcited. After focus, the pump pulse was blocked by a pulse blocker B while the probe pulse was collected with a lens L and coupled to a fiber spectrometer S or a slit monochromator, depending on the wavelength, and time-resolved absorption spectrograms were recorded.

In a first configuration, the probe pulse was taken as the direct output of the Ti: sapphire laser system (not shown) at a central wavelength of 780 nm. An independent grating compressor (not shown) was used to modify the probe pulse duration by introducing positive or negative linear dispersion by changing the gratings separation (FIGS. 2A-2B). An acousto-optic programmable dispersive filter (AOPDF) (not shown) inside the laser chain was also used to introduce a third-order dispersion term in the spectral phase (FIG. 2C).

In FIGS. 2A-2C, the dot lines represent the delay of absorption for each individual wavelength such as determined by minimizing the error between the time-dependent absorption profiles and an ideal Gaussian error function. A least-mean square method was used to fit the experimental profiles, while relation (1) below was used in modeling a single wavelength intensity versus probe delay, with fitting parameters A, B, T and D representing respectively the height, transition width, transition delay and baseline of an ideal Gaussian error function.

$$I(\tau) = A erf\left(\frac{(\tau - T)}{B}\right) + D \quad (1)$$

As the probe pulse is absorbed with respect to a fixed non-stationary temporal amplitude filter, the group delay $T(\lambda)$ appears in the absorption spectrogram as a time-wavelength representation. It can be observed that the group delay remains constant for a compressed pulse (FIG. 2A), a quadratic phase corresponds mainly to a linear slope (FIG. 2B), and a cubic phase corresponds rather to a C-shape (FIG. 2C). It should be noted that for larger spectral phase coefficients or broader bandwidth, the representation is intuitive only if performing a transformation of the spectrogram from wavelength to frequency axis.

Figures 2D, 2E, 2F:
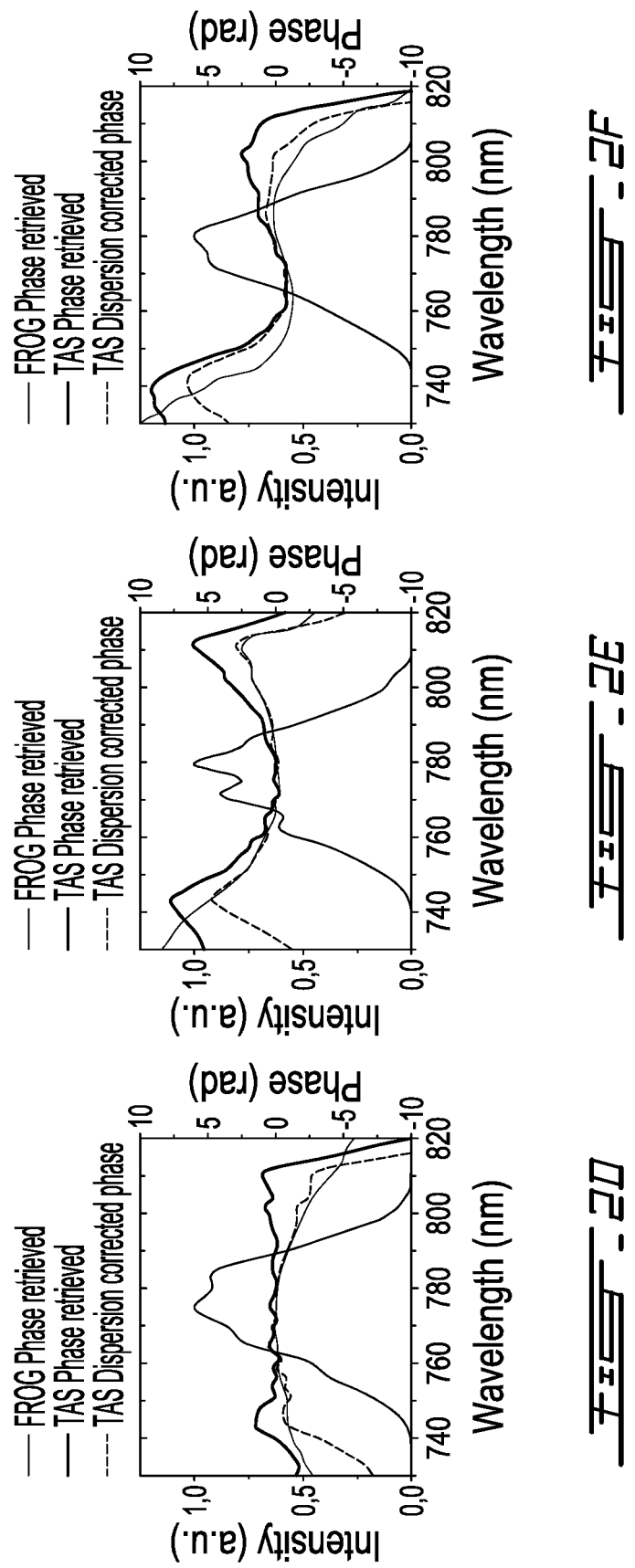
FIGS. 2D, 2E and 2F show spectral phase measured with a transient absorption spectrometry (TAS) according to an aspect of an embodiment of the present disclosure and compared with second-harmonic frequency-resolved optical gating method (SHG-FROG)

The transient absorption spectrometry (TAS) spectral phase characterization according to an aspect of an embodiment of the present disclosure was compared to the conventional second-harmonic frequency-resolved optical gating method (SHG-FROG) as a reference (FIGS. 2D-2F). In FIGS. 2D-2F, the SHG-FROG spectral phase was obtained by retrieving the FROG trace for each compressor and AOPDF settings, as the transient absorption spectrometry (TAS) spectral phase was obtained by determining the group delay using the routine previously described and integrating along the wavelength coordinate such that $\varphi(\omega)=\int_{\omega_1}^{\omega_2} T(\omega) d$.

For those spectrograms, the phase measured with transient absorption spectrometry (TAS) according to an aspect of an embodiment of the present disclosure is different from the reference phase; a correction corresponding to the linear dispersion inside the absorption material was applied, using the Sellmeier equation of ZnSe with 0.5 mm propagation corresponding to the material thickness, and the corrected phase coincides with the phase obtained using the SHG-FROG method. FIGS. 2D, 2E and 2F show results obtained with the present method and system comprising applying a correction corresponding to the linear dispersion inside the absorption within materials of a thickness of 500 µm.

Figures 2G, 2H, 2I:
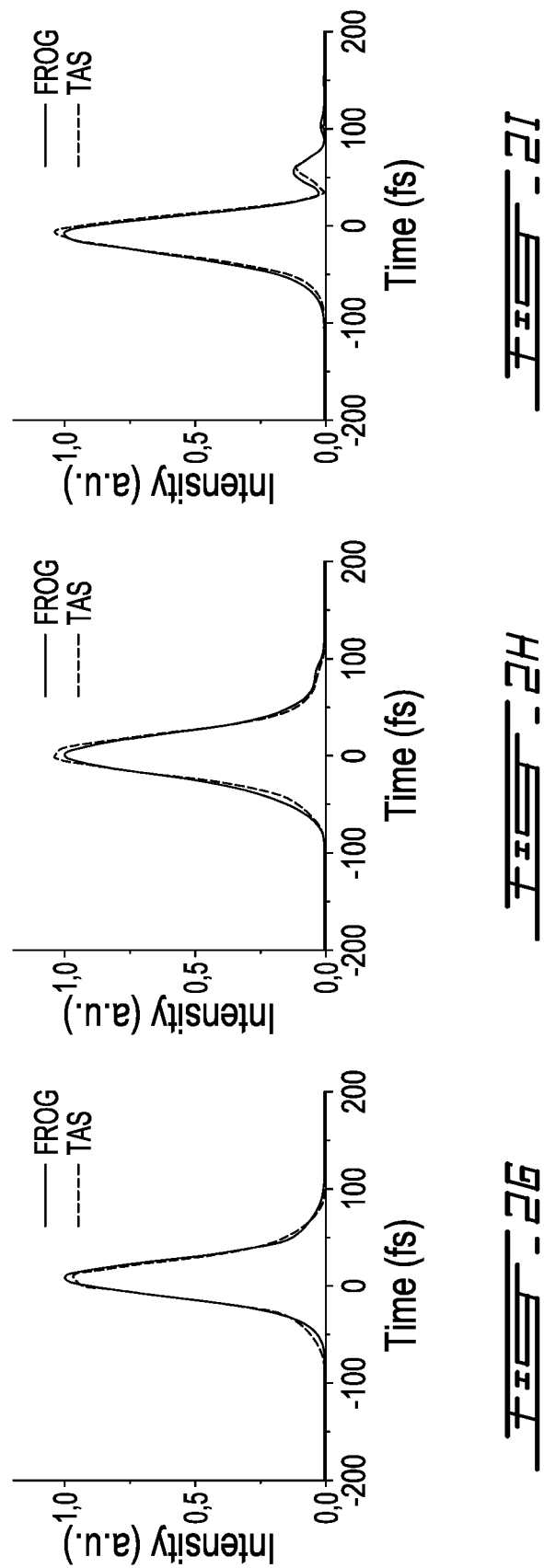
FIGS. 2G, 2H and 2I show pulse intensity distribution obtained with the transient absorption spectrometry (TAS) according to an aspect of an embodiment of the present disclosure method and compared with second-harmonic frequency-resolved optical gating method (SHG-FROG)

The pulses were reconstructed to evaluate the phase measurement precision. As can be seen in FIGS. 2G-2I, the pulse reconstruction for the transient absorption spectrometry (TAS) according to an aspect of an embodiment of the present disclosure results in the same pulse durations as for SHG-FROG with a peak intensity deviating at most by 6% from the reference peak intensity (FIG. 2H). Therefore, the laser pulse characterization using the two different methods is consistent, provided an offset correction is applied.

In a following step, the transient absorption spectrometry (TAS) according to an aspect of an embodiment of the present disclosure was investigated for the characterization of pulses with longer wavelength in the infrared, at 2000 nm, and using different materials. For that purpose, the probe pulse line at 800 nm was converted through a commercial optical parametric amplifier (TOPAS, light conversion), while the pump pulse line at 780 nm was kept the same except for adjusting the pulse path length to synchronize the pump with the TOPAS output. This way, the TOPAS idler pulse at a central wavelength of 2000 nm was characterized using both the transient absorption spectrometry according to an aspect of an embodiment of the present disclosure and SHG-FROG methods.

Figure 3A:
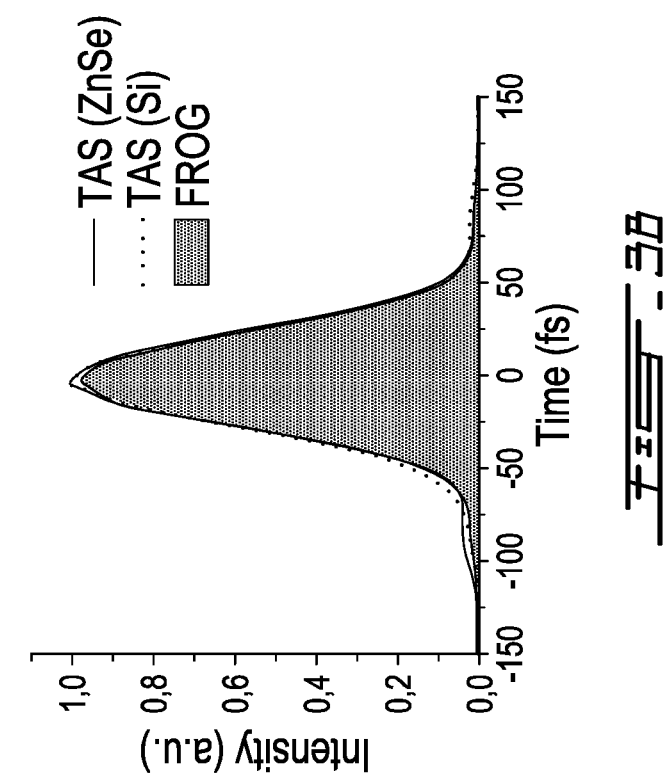
FIG. 3A shows spectrum and spectral phase obtained at 2 μm using the transient absorption spectrometry (TAS) according to an aspect of an embodiment of the present disclosure compared with results obtained through second-harmonic frequency-resolved optical gating method (SHG-FROG) retrieval.
Figure 3B:
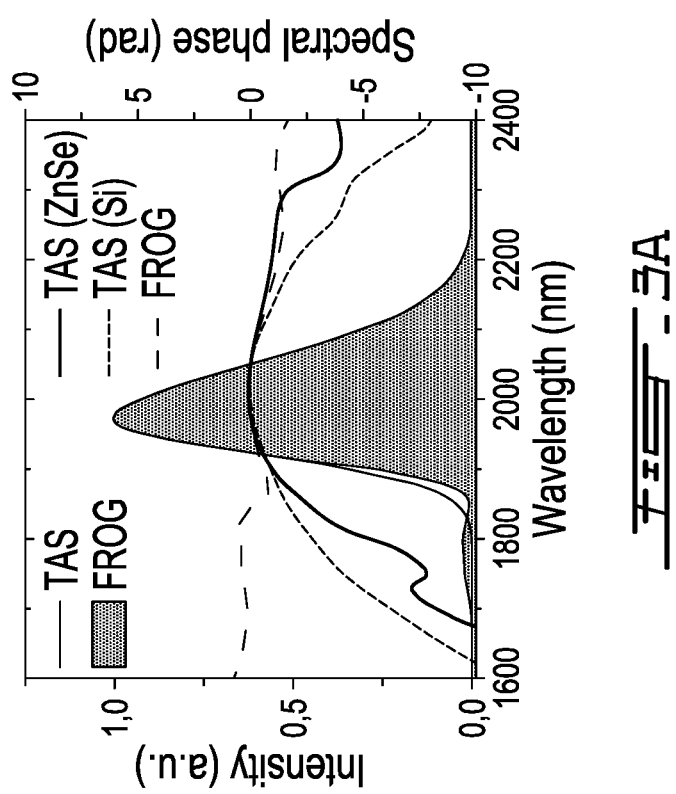
FIG. 3B shows reconstructed pulse intensity distribution.

For the transient absorption spectrometry according to an aspect of an embodiment of the present disclosure, the phase measured by using two different photoexcited materials ZnSe and Si is consistent and results in the same reconstructed pulse duration of 60 fs FWHM (FIGS. 3A-3B). It is also consistent with the pulse and phase retrieved from conventional SHG-FROG. This comparison confirms that the transient amplitude filter can be induced by absorption processes of different orders without compromising the characterization result. For instance, the pump wavelength at 800 nm corresponds to a photon energy of 1.5 eV and therefore, photoexcitation in ZnSe with a bandgap at 3.6 eV requires multiple photons while in the case of Si, with a bandgap at 1.1 eV, it requires a single photon. Thus, using a material of a band gap less than the pump pulse photon energy $E_{pump}$ ($E_{gap}<E_{pump}$) allows to saturate the absorption contrast ratio at a lower pump intensity. In this specific configuration, saturation was reached with a pump energy of 1 µJ in Si as compared with 4.8 µJ in ZnSe. This also demonstrates the possibility to use different materials and pump wavelength combinations, extending the range of application of the present transient amplitude filter method.

Figure 4:
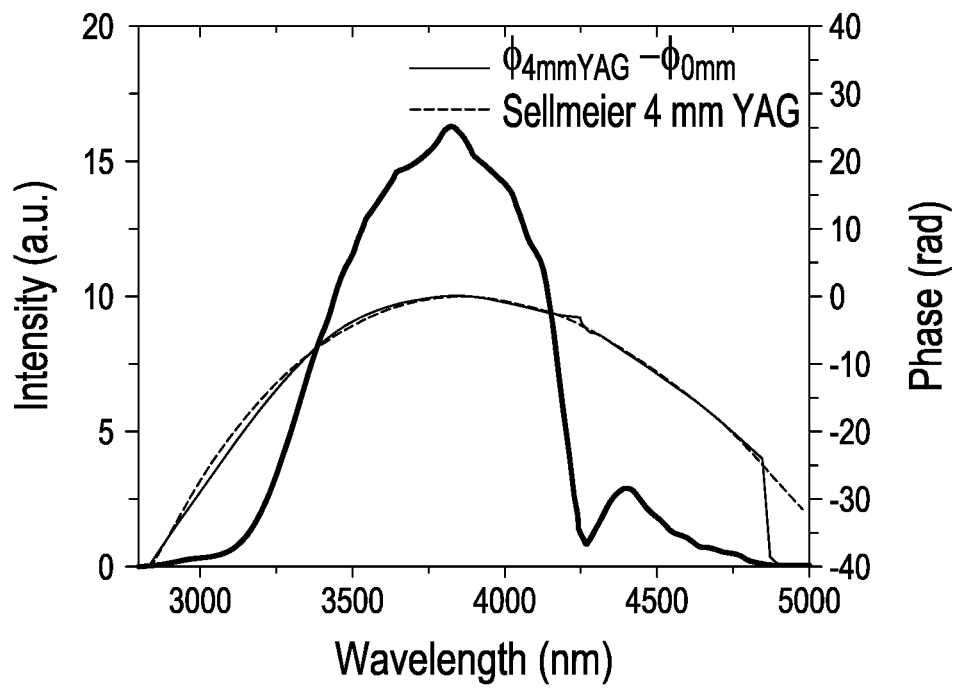
FIG. 4 shows spectrum and phase difference at 3.8 μm obtained with the transient absorption spectrometry (TAS) according to an aspect of an embodiment of the present disclosure; the phase difference (solid line) being compared with the phase calculated from the Sellmeier equation of YAG (dashed line)

The method was further tested for laser pulses with central wavelength further in the mid infrared region from 3 to 4.7 µm (FIG. 4). By tuning the TOPAS wavelength close to 1.3 µm signal and 2.0 µm idler, a probe pulse with central wavelength at 3.8 µm was generated by performing difference-frequency mixing using a 150 µm thick LgSe crystal, and the pump was kept the same with a pulse duration of 35 fs and central wavelength at 780 nm. For this spectral range, the present transient absorption spectrometry (TAS) method was validated by comparing the phase difference of two different spectrograms with the theoretical dispersion of a reference material.

In FIG. 4, it is observed that the phase difference obtained by applying the transient absorption spectrometry (TAS) according to an aspect of an embodiment of the present disclosure is consistent with the spectral phase calculated from the Sellmeier equation of YAG. The initial pulse phase was measured to serve as a reference; a 4 mm YAG window was inserted into the pulse path and the phase differences determined from the transient absorption spectrometry (TAS) spectrogram coincide with the theoretical phase calculation over the entire mid infrared bandwidth of this pulse.

Thus, a direct spectral phase characterization method comprising using a linear temporal non-stationary amplitude filter to characterize the phase and amplitude of laser emission was demonstrated. As a result, since the dynamic range of detection is on the same level as the fundamental pulse, the detection threshold can be lower than frequency mixing methods. The method also improves practical considerations. For example, a range of materials can be used. Moreover, polymorphic optical materials of a band gap less than about 4 eV may be easily available and do not require a specific orientation. Also, the absorption process does not depend on the polarization, which can be suitable in the case of arbitrary polarized laser pulses. The bandwidth limitation depends only on the range of transparency of the material used. The method may be used to characterize very low intensity, ultra-broadband dispersed pulses, for example pulses of intensity below $1\times10^9$ W/cm$^2$ and with $\Delta\omega/\omega_0 > 2$, such as super continuum emission with signal level close to the detection limit. Additionally, it is possible to spatially resolve the spectral phase distribution for a complete spatio-temporal characterization of a pulse.

Figure 5:
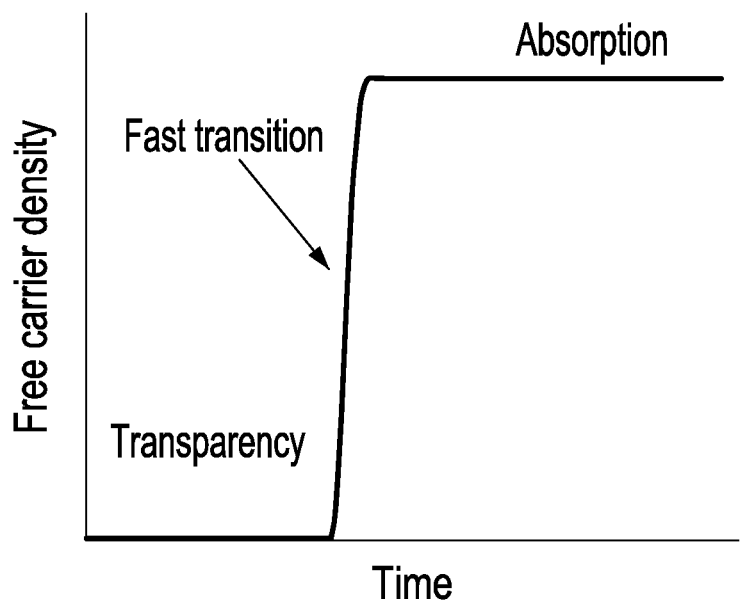
FIG. 5 shows a schematic view of the free electron density evolution resulting from the absorption of an ultrashort laser pulse.

There is thus provided a time-resolved absorption pump-probe method comprising exciting a material having a relatively low band-gap with an independent high intensity ultrashort laser pulse, resulting in the instantaneous promotion of electrons from the valence to the conduction band, creating an ultrafast raise of the free electron density and forming a linear temporal non-stationary amplitude filter. (FIG. 5).

Figure 1B:
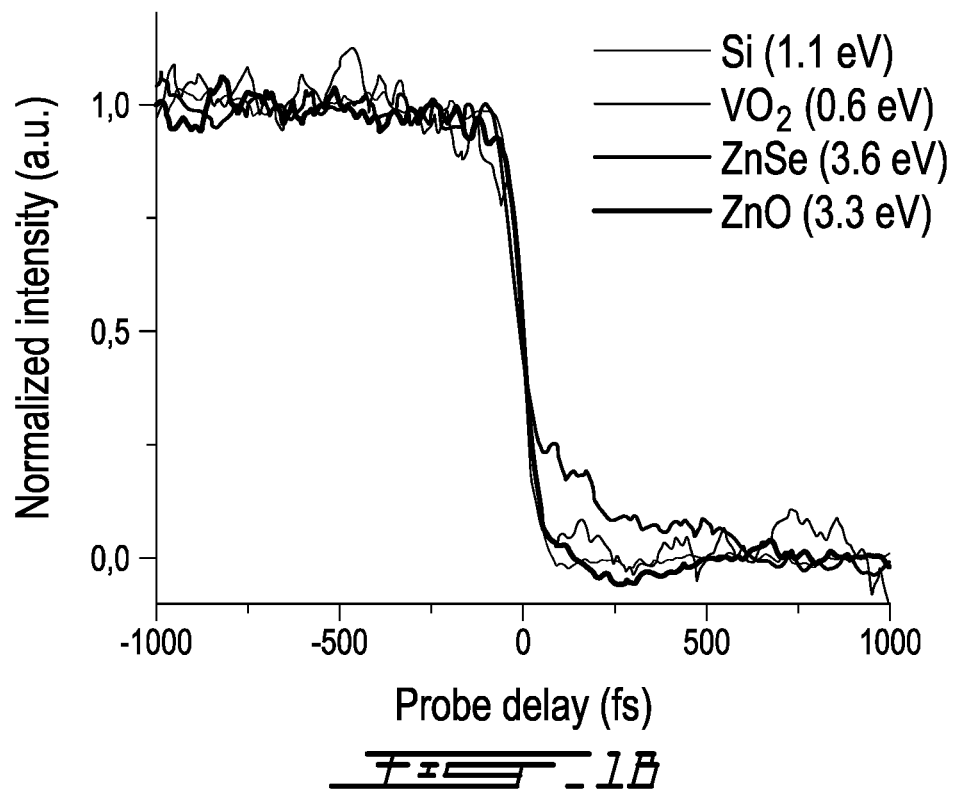
FIG. 1B shows time-resolved absorption profiles for different photo-excited materials with band gap value in parentheses.
Figure 1C:
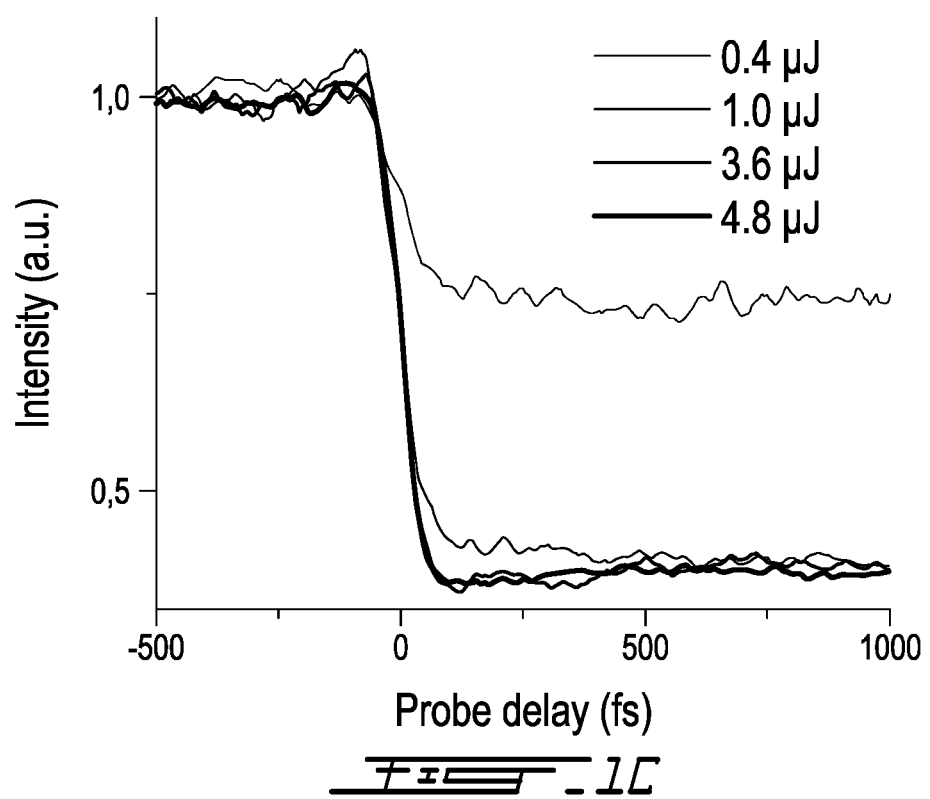
FIG. 1C shows time-resolved absorption profiles for variable pump energy and saturation observed in silicon.
Figure 10:
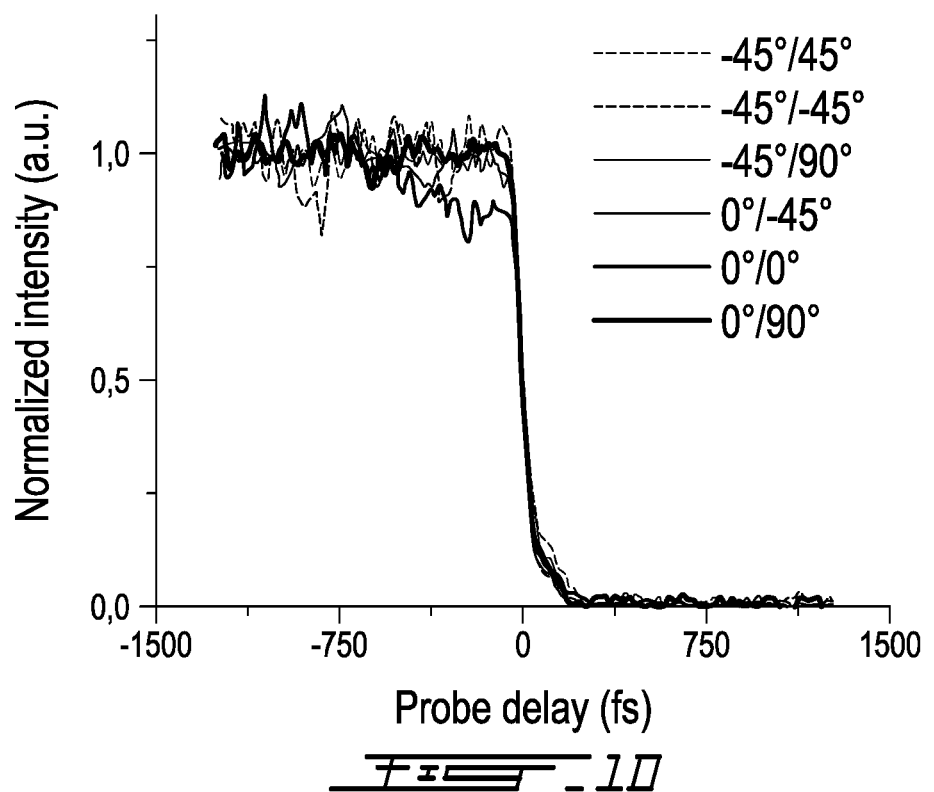

Such an amplitude filter was experimentally observed using materials having different electronic band structures (FIG. 1B). It was also observed that the absorption saturates at a peak fluence below the ablation threshold (FIG. 1C) and is independent of light polarization (FIG. 1D). From these absorption profiles, it is assumed that the electrons remain trapped in the conduction band for a time significantly longer than the optical pulse and therefore it is considered that the material response remains constant after excitation. This temporal non-stationary amplitude filter provides a mean to resolve the probe group delay $(d\theta(\omega))/d\omega$ by measuring the probe spectrum undergoing free carrier absorption as it is delayed with respect to the fixed transition. In the above-described experiments it was shown that such excitation can be induced by near infrared laser pulses in different low band-gap materials. It was also demonstrated that the temporal gate gives a linear response on the probe spectral phase distribution and allows to properly characterize its complex electric field.

Figure 6:
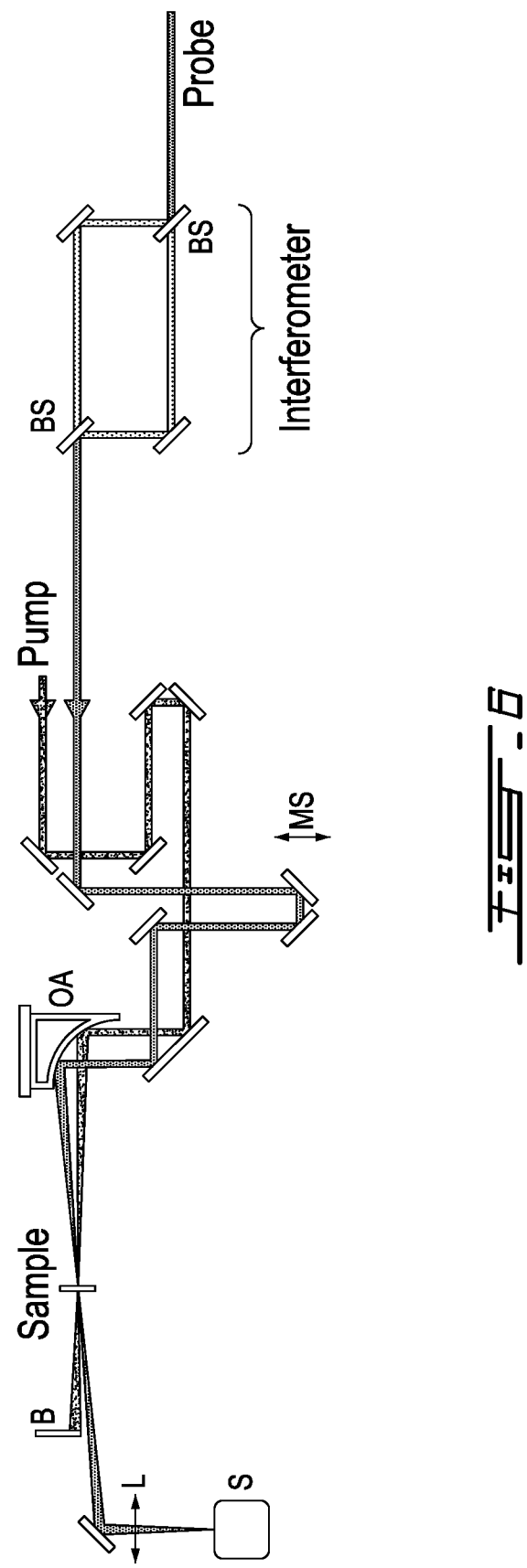
FIG. 6 shows a system according to an embodiment of an aspect of the disclosure.

FIG. 6 illustrates an embodiment of the method and system, which relies on detecting a time-dependant variation of intensity by acquiring a probe spectrogram. The method comprises including an interferometer (pulse splitters BS in FIG. 6) on the probe pulse path, for spectral interferometry on the probe intensity. Thus, the signal variation measured in the interferometric spectrogram has a contrast depending on the field amplitude variation rather than its intensity, thereby increasing the sensitivity by a factor of the square root of the intensity variation.

Figure 7A:
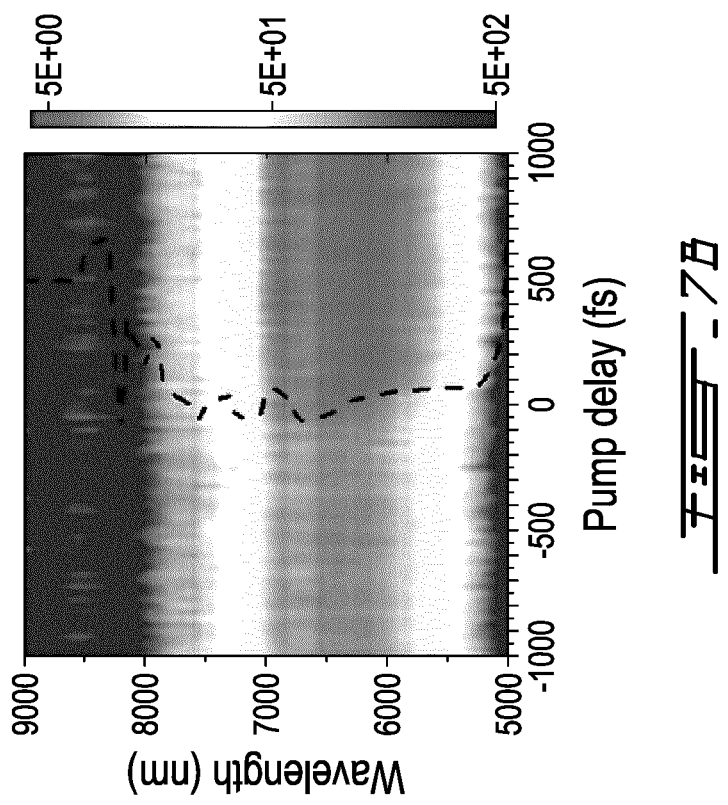
FIG. 7A shows a transient absorption spectrogram (TAS) obtained from photoexcitation of a thin $VO_2$ layer of 500 nm thickness according to an aspect of an embodiment of the present disclosure; dashed line shows the group delay as a function of wavelength for pulses with central wavelength at 3.6 μm.
Figure 7B:
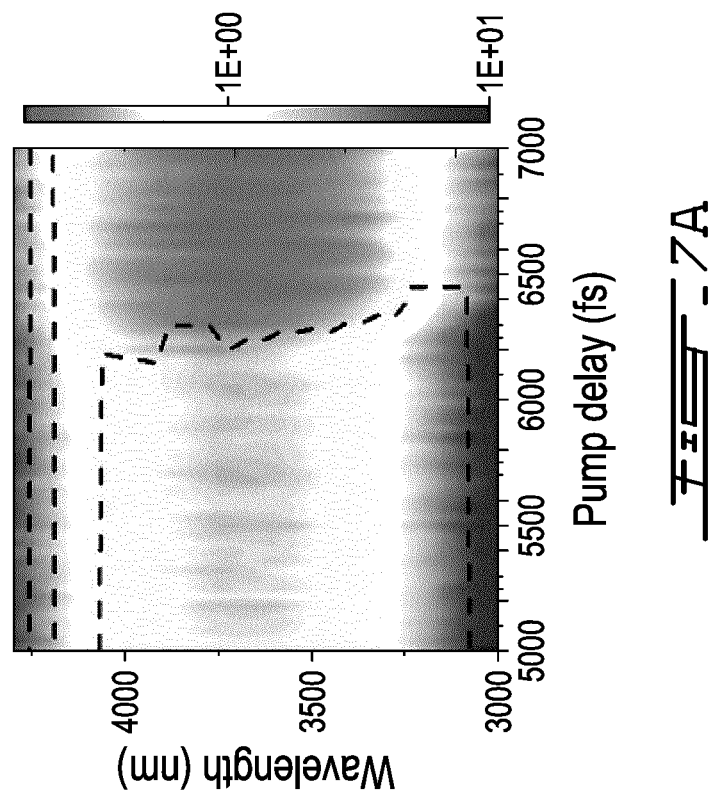
FIG. 7B shows a transient absorption spectrogram (TAS) obtained from photoexcitation of a thin $VO_2$ layer of 500 nm thickness according to an aspect of an embodiment of the present disclosure; dashed line shows the group delay as a function of wavelength for pulses with central wavelength at 6.5 μm.

FIGS. 7 present results obtained using Vanadium dioxide $VO_2$ of a thickness of 500 nm, showing that the method and system may be used with materials of a very low thickness, for example below 2 mm, for example in the range between about 100 nm and about 100 µm, which does not introduce dispersion while yielding absorption contrast. There is thus provided a method and a system for temporal characterization of infrared ultrashort laser pulses with arbitrary emission wavelength by mean of free carrier absorption induced in low band-gap materials, such as ZnSe, LgSe, ZnO, $VO_2$, Si, Ge, fused silica, silicon nitrides for example, depending of the pump. The method allows measuring the arrival time versus wavelength with respect to an absorption gate, which is sufficient to determine the spectral phase distribution of a coherent ultra-broadband spectrum.

Thus, temporal characterization of an ultrashort laser pulse may be achieved by its propagation through low band-gap materials photoexcited by a pump pulse. The pump pulse is an independent second ultrashort laser pulse, which creates a transient absorption gate by generating a high density of free electrons inside the low band-gap dielectric or semiconductor material. The transient gate is such that when the probe pulse comes at an earlier time, the probe pulse is transmitted without being modified, whereas if the probe comes later than the gate, it is partially absorbed. The transmitted signal remains constant after the transition as compared with the probe pulse duration. Thus, the absorption gate has a step-like behavior (see FIG. 5). Using this mechanism, the probe ultrashort pulse is propagated through the material and the transmitted spectrum is measured as a function of the delay between the probe and the absorption gate. This sequential acquisition results in a spectrogram where the phase information of the probe pulse is encoded (see FIGS. 8). It is shown that the arrival time of each spectral component can be extracted from such spectrograms and thus the temporal intensity distribution of ultrashort laser pulses having different central wavelengths, ranging from near infrared to mid infrared, can be characterized. In FIGS. 8, phase characterization of ultrashort femtosecond pulses with central wavelength ranging from 800 nm to 12 µm is shown.

Figure 9:
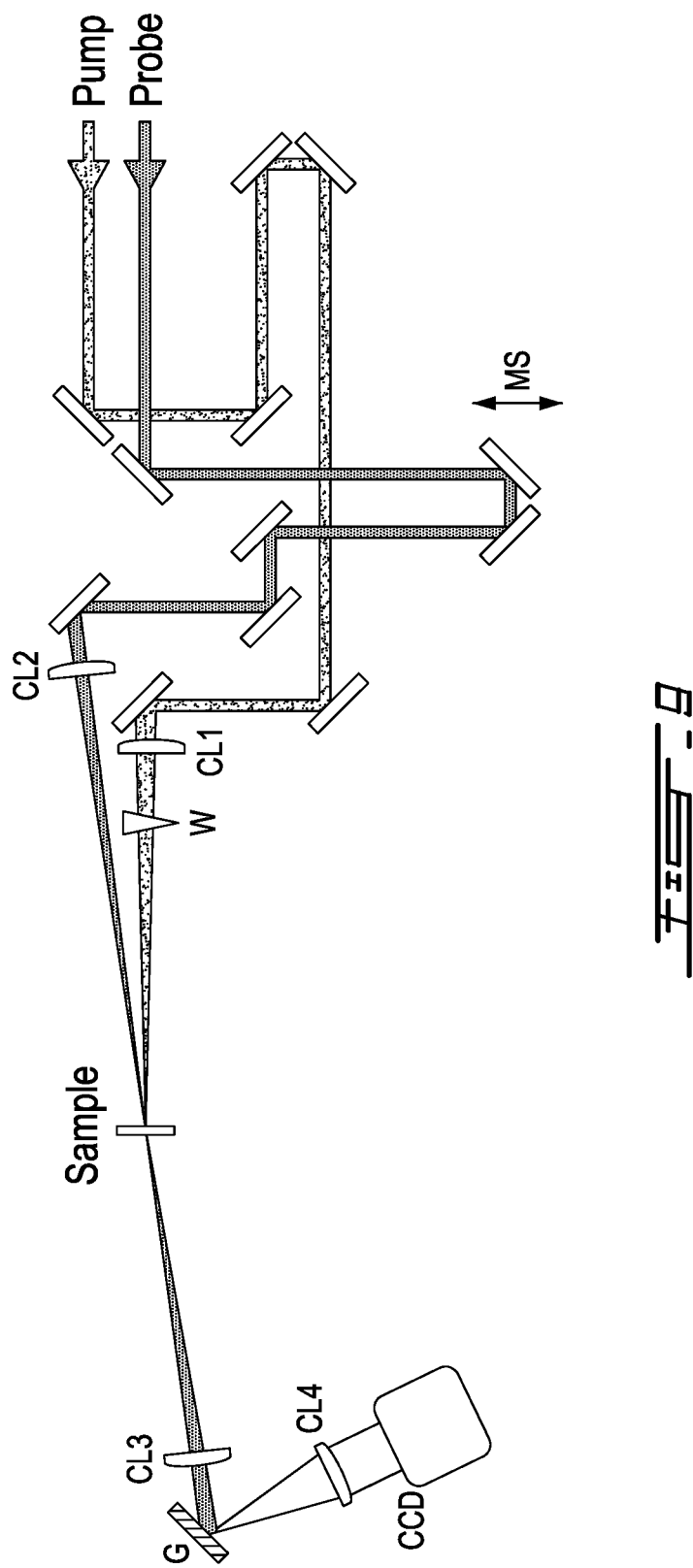
FIG. 9 shows a system according to an embodiment of an aspect of the disclosure.

As discussed hereinabove in relation to FIGS. 1 and 6, in the system illustrated in FIG. 9, the motorized translation stage MS is used to vary the delay between the pump and probe pulses, and the spectrogram is made by acquiring a spectrum for a range of delay positions in a sequential routine. This acquisition procedure requires multiple laser pulses and may be subject to pulse to pulse variations. It may also be time consuming and this may represent some limitation for low repetition rate systems.

To overcome such possible shortcomings, an optical component may be used to introduce a variable delay along one dimension of the pump laser pulse. For example, FIG. 9 shows a thin wedge W inserted on the pump pulse path such that an upper part of the pump pulse is delayed with respect to a lower part of the pump pulse, resulting in a spatial dependence of the delay of the pump pulse in a vertical dimension. A translation stage MS allows adjusting the delay between the pump and probe pulses so that the zero delay coincides with the central part of the pulses. Then, both the pump and probe pulses are focused to a vertical line onto the material using cylindrical lenses $CL_{1,2}$ or cylindrical mirrors for example. Therefore, the transient absorption is taking place simultaneously at multiple positions along the vertical dimension, with a constant variation of the pump delay. After the interaction, the probe beam is collimated with cylindrical lens $CL_3$, dispersed in wavelength along the horizontal direction with a grating G and collimated again in the same direction with a cylindrical lens $CL_4$. As a result, each point of the vertical line is dispersed and corresponds to the spectrum that was interacting at different pump delays. Finally, a CCD camera is used to acquire the two-dimension transient absorption spectrogram, which is generated from a single laser pulse in this configuration. Such a system allows single-shot acquisition of a transient absorption spectrogram.

There is thus provided a method and a system for characterizing the spectral phase distribution of a broadband laser pulse by time and frequency resolved absorption.

The present pump-probe method involves a first ultrashort laser pulse with sufficient intensity to promote electrons in the conduction band of a thin layer of a semiconductor through single or multiphoton absorption. During the rise time of the pump pulse, the free carrier density increases rapidly and remains after the pump duration due to electron trapping in the conduction band of the semiconductor layer (FIG. 5). The fast transition inside the semiconductor layer represents a wavelength independent time gate if the free carrier density is sufficient to absorb the probe pulse. By varying the pump and probe relative delay and recording the probe spectrum for each delay, the spectrogram acquired this way reveals the arrival time for each spectral component (FIGS. 2A-2C). The integration of the arrival time along the wavelength yields the spectral phase distribution.

In the non-stationary linear method as disclosed herein, the phase information is transferred into the spectrogram as the absorption delay corresponds directly to the spectral phase derivative.

The present method and system may find a range of applications, for example for the characterization of mid-infrared and far-infrared laser emission. Since the dynamic range of detection is on the same level as the fundamental pulse, the detection threshold can be lower than frequency mixing methods and it becomes easier to characterize highly dispersed, low intensity pulses. Having a linear response over the complex field phase derivative also allows relaxing the calibration constraints.

The excited material may be chosen to minimize propagation effects that would lead to improper characterization of the pulse. For example, the material thickness may be reduced such that the dispersion is negligible for the probe pulse. Alternatively, a material transparent to the probe pulse but opaque to the pump pulse may be selected, provided that the pump and probe pulses have different central wavelengths and that their respective spectra have no common bandwidth. This way, the pump pulse excites the material at its surface and the interaction between the pump and probe pulses takes place before any propagation effect occur. Therefore, a spectrogram corresponding to the actual pulse, unaltered by propagation through the excited material, may be measured.

A method was developed to extract the full information available from the spectrograms acquired by this transient absorption mechanism.

Such acquired spectrogram is a 2-dimension array of data representing the probe pulse intensity. In the first dimension, the probe intensity is materialized as a function of the delay between the transient time-gate and the probe pulses. In the second dimension, the probe intensity is materialized as a function of wavelength.

The spectrogram analysis may be performed using a numerical method, comprising applying a fit function to the absorption profiles resulting from the convolution of the probe pulse with the absorption gate. In the spectrogram, the absorption profiles are observed along the first dimension, by plotting the intensity versus delay. This way, the arrival time, T, for each wavelength, $\lambda$, is determined by fitting the corresponding absorption profile to a Gaussian error function. Considering that the distribution of the arrival time corresponds to the pulse group delay $T(\lambda)$, the spectral phase $\phi(\lambda A)$ is simply obtained by numerical integration of the group delay with respect to wavelength. Then, the pulse temporal intensity is reconstructed by numerical inverse Fourier transformation, taking into account the measured spectral phase distribution. The validity of the method depends on the similitude between the real absorption gate and the ideal function used for the fit. It means that the measurement needs be taken under suitable conditions in which the experimental absorption profiles can be fit with confidence to this ideal function.

The spectrogram may also be reconstructed using an iterative method, as will now be presented.

A method according to an embodiment of an aspect of the disclosure comprises reconstructing the spectrograms by using the ptychography equations or the blind-FROG equations. Both are based a first projection in the temporal domain and a second projection in the Fourier domain. The Fourier domain projection consists in replacing the intensity of a guessed spectrogram by the intensity of the measured spectrogram. The temporal domain projection consists in extracting two temporal pulses that best describe the spectrogram of a previous iteration. After several iterations, those projections correspond to the actual temporal pulse from the spectrogram. Different algorithmic structures, such as the PCGPA (principal component generalized projections algorithm) in blind-FROG, or the difference map algorithm (with two singular cases known as the ER (error reduction) algorithm, or the HIO (hybrid Input output) algorithm) in ptychography for example, can be used depending on the order the two projections are used. Despite different converging properties, they all reconstruct the same solution. Blind FROG or ptychographic algorithms can be employed for this reconstruction.

The result of such a reconstruction is shown in FIGS. 8 for pulses with central wavelength of 800 nm (FIG. 8A), 1650 nm (FIG. 8B), 4.8 µm (FIG. 8C) and 10 µm (FIG. 8D). Transient absorption (line 3) and the pulse (line 4) are reconstructed. The pulse at 10 µm (d) is ultrabroad on more than an octave.

As shown in the second row of FIG. 8, the spectrograms can be reconstructed with high accuracy from the retrieved pulses. Thus, there is no need to make any assumption about the absorption gate and measurements may be performed with an arbitrary or unknown pump pulse. The ptychography method allows to take full advantage of the optical method presented hereinabove, with exhaustiveness and self-consistency. It allows to retrieve the amplitude and phase of both temporal objects that are encoded in the spectrogram.

Since the method allows to retrieve two independent temporal objects, it is possible to characterize ultrashort pulses even with a pump pulse having a longer duration than the probe pulse. The method is therefore highly permissive in terms of the pump pulse duration and the measurement is unmodified if different pump pulses are used to excite the material.

The retrieval method, in combination with the transient absorption spectroscopy, yields an optical gating method whose measured signal is linear with the pulse spectrum, referred to as linear ptychographic frequency resolved optical gating method, which fills the gap between linear and nonlinear methods and combines advantages of both.

The method is based on an optical gating measurement in absence of phase matching condition. The spectrum of the pulse to be characterized is directly included in the measured FROG trace, which makes it convenient for both low intensity and ultra-broadband pulses for instance.

The present linear ptychographic frequency resolved optical gating method is exhaustive and allows extracting the full information available from the acquired spectrograms. The method allows taking into account small scale modulations that are observed experimentally in the spectrogram absorption profiles.

The method allows taking into account the phase modulation of the probe while it is absorbed through the gate. During the absorption, the probe pulse undergoes a temporal modulation that modifies slightly its instantaneous spectrum. The modulation varies according to different parameters such as the gate steepness and the probe dispersion and is unpredictable if the gate is unknown. This information is encoded by the spectrogram and can be resolved or taken into account by the method.

The method and system allow measuring arbitrary emission or arrival time, which is directly related to the spectral phase with a linear non-stationary process. Associated with the measurement of the spectrum, the method provides a complete characterization of pulses in spectral regions ranging from visible to far infrared wavelengths.

The scope of the claims should not be limited by the embodiments set forth in the examples but should be given the broadest interpretation consistent with the description.

REFERENCES

1. Spence, D. E., P. N. Kean, and W. Sibbett, *60-fsec pulse generation from a self-mode-locked Ti:sapphire laser.* Optics Letters, 1991. 16(1): p. 42-44.
2. Piché, M. and F. Salin, *Self-mode locking of solid-state lasers without apertures.* Optics Letters, 1993. 18(13): p. 1041-1043.
3. Kane, D. J. and R. Trebino, *Characterization of arbitrary femtosecond pulses using frequency-resolved optical gating.* IEEE Journal of Quantum Electronics, 1993. 29(2): p. 571-579.
4. Iaconis, C. and I. A. Walmsley, *Self-referencing spectral interferometry for measuring ultrashort optical pulses.* IEEE Journal of Quantum Electronics, 1999. 35(4): p. 501-509.
5. Wu, Q. and X.-C. Zhang, *Free-space electro-optics sampling of mid-infrared pulses.* Applied Physics Letters, 1997. 71(10): p. 1285-1286.
6. Lozovoy, V. V., I. Pastirk, and M. Dantus, *Multiphoton intrapulse interference. IV Ultrashort laser pulse spectral phase characterization and compensation.* Optics Letters, 2004. 29(7): p. 775-777.
7. Lee, K. F., et al., *Characterization of mid-infrared femtosecond pulses [invited].* Journal of the Optical Society of America B, 2008. 25(6): p. A54-A62.

8. Verhoef, A. J., et al., *Plasma-blueshift spectral shear interferometry for characterization of ultimately short optical pulses.* Optics Letters, 2009. 34(1): p. 82-84.
9. Walmsley, I. A. and V. Wong, *Characterization of the electric field of ultrashort optical pulses.* Journal of the Optical Society of America B, 1996. 13(11): p. 2453-2463.
10. Hartmann N, et al., *Sub-femtosecond precision measurement of relative X-ray arrival time for free-electron lasers.* Nat Photon, 2014. 8(9): p. 706-709.
11. Bionta, M. R., et al., *Spectral encoding method for measuring the relative arrival time between x-ray/optical pulses.* Review of Scientific Instruments, 2014. 85(8): p. 083116.

The invention claimed is:

1. A method, comprising forming a linear temporal non-stationary amplitude filter by interacting a high intensity ultrashort laser pump pulse with a photo-excitable material, focusing an ultrashort broadband laser probe pulse over the photo-excited material, acquiring a two-dimensional spectrogram in which both temporal probe pulse and the linear non-stationary amplitude filter are encoded, and retrieving amplitudes and phases of both the temporal probe pulse and the linear non-stationary amplitude filter from the two-dimensional spectrogram, wherein the method comprises convoluting the probe pulse with the photo-excited material by varying a delay between the probe pulse and the photo-excited material forming the linear temporal non-stationary amplitude filter in scanning delay steps, frequency resolving and measuring a resulting convolution signal for a range of delay positions, recording the non-stationary amplitude filter and the probe pulse from the convolution signal, and retrieving amplitudes and phases of the non-stationary amplitude filter and the probe pulse from the recorded non-stationary amplitude filter and the probe pulse, yielding temporal characterization of the ultrashort broadband probe pulse.

2. The method of claim 1, comprising varying the delay-using a translation stage on the path of the probe pulse and acquiring a spectrum for a range of delay values.

3. The method of claim 1, wherein said-varying the delay introducing a variable delay along one dimension of the pump pulse.

4. The method of claim 1, comprising introducing a variable delay along one dimension of the pump pulse, focusing the pump and probe pulses to a line along the one dimension, and then dispersing the probe pulse, each point of the line in the one dimension being dispersed corresponding to a spectrum at different pump delays.

5. The method of claim 1, comprising introducing spectral interferometry on the probe pulse path.

6. The method of claim 1, comprising one of: i) transmitting the probe pulse through the excited material and ii) reflecting the probe pulse from a surface of the excited material; and collecting the probe pulse after focus.

7. The method of claim 1, comprising selecting a wavelength of the pump pulse depending on the photo-excitable material.

8. The method of claim 1, wherein the pump pulse has a duration of at most 1 ps, an intensity of at least $1\times10^{12}$ W/cm$^2$ at the surface of the material and a wavelength in a range between 200 nm and 20 microns; and the probe pulse has a duration comprised in a range between 5 fs and 1 ns, an intensity of at most $1\times10^{11}$ W/cm$^2$ at the surface of the material and a wavelength in a range between 200 nm and 20 microns.

9. The method of claim 1, comprising adjusting an energy of the pump pulse to reach an absorption saturation of the probe pulse and a fluence below the photo-excitable material ablation threshold.

10. The method of claim 1, wherein the photo-excitable material is one of: a low band-gap dielectric and a low band-gap semi-conductor.

11. The method of claim 1, wherein the probe pulse has a duration comprised in a range between 5 fs and 1 ns an intensity of at most $1\times10^{11}$ W/cm$^2$ at the surface of the material and a wavelength in a range between 200 nm and 20 microns.

12. The method of claim 1, wherein the probe pulse has a duration comprised in a range between 5 fs and 1 ns an intensity of at most $1\times10^{11}$ W/cm$^2$ at the surface of the material, a wavelength in a range between 200 nm and 20 microns, and $0 > \Delta\omega/\omega_0 > 2$, $\Delta\omega$ being a bandwidth thereof and $\omega_0$ a central frequency thereof.

13. The method of claim 1, wherein the material has a band gap in a range between 0.5 and 9 eV.

14. The method of claim 1, wherein the material has a band gap in a range between 0.5 and 4 eV.

15. The method of claim 1, wherein the photo-excitable material has a thickness comprised in a range between 100 nm and 100 μm.

16. The method of claim 1, wherein the photo-excitable material has a thickness of at most 2 mm.

17. A method, comprising propagating a first ultrashort laser pulse through a linear temporal non-stationary amplitude filter formed by a low band-gap material photoexcited by a second independent ultrashort laser pulse, convoluting the first ultrashort laser pulse with the photo-excited material by varying a delay between the first ultrashort laser pulse and the photo-excited material forming the linear temporal non-stationary amplitude filter, measuring, for a range of delay positions, a resulting spectrum as a function of the delay, and obtaining amplitude and phase characterization of a time-gate induced in the material by the second ultrashort laser pulse and of the first ultrashort laser pulse from the measurement as a function of the delay.

18. The method of claim 17, wherein the material has a band gap in a range between 0.5 and 9 eV; and the first ultrashort laser pulse has with a duration comprised in a range between 5 fs and 1 ns an intensity of at most $1\times10^{11}$ W/cm$^2$ at a surface of the material.

19. The method of claim 17, comprising one of: i) transmitting the first ultrashort laser pulse through the photoexcited material and ii) reflecting the first ultrashort laser pulse from a surface of the photoexcited material.

* * * * *